US010746105B2

(12) United States Patent
Murayama et al.

(10) Patent No.: US 10,746,105 B2
(45) Date of Patent: Aug. 18, 2020

(54) CONTROL DEVICE AND CONTROL METHOD USING FUEL SUPPLY ACCELERATION COMMAND VALUE

(71) Applicant: Mitsubishi Hitachi Power Systems, Ltd., Kanagawa (JP)

(72) Inventors: Masato Murayama, Yokohama (JP); Takanori Tsutsumi, Tokyo (JP); Yoshinori Koyama, Tokyo (JP); Ken Tamura, Yokohama (JP); Takashi Fujii, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 540 days.

(21) Appl. No.: 15/113,197

(22) PCT Filed: Oct. 7, 2014

(86) PCT No.: PCT/JP2014/076821
§ 371 (c)(1),
(2) Date: Jul. 21, 2016

(87) PCT Pub. No.: WO2015/122051
PCT Pub. Date: Aug. 20, 2015

(65) Prior Publication Data

US 2017/0009606 A1 Jan. 12, 2017

(30) Foreign Application Priority Data

Feb. 14, 2014 (JP) ................................ 2014-026662

(51) Int. Cl.
*F02C 9/32* (2006.01)
*F02C 9/28* (2006.01)
(Continued)

(52) U.S. Cl.
CPC .............. *F02C 9/32* (2013.01); *F01K 23/101* (2013.01); *F02C 9/28* (2013.01); *F01K 23/16* (2013.01);
(Continued)

(58) Field of Classification Search
CPC ................. Y02E 20/18; C10J 2300/165; C10J 2300/1653; F02C 9/28; F02C 9/32; F02C 9/40; F02C 3/28; F05D 2270/3015
See application file for complete search history.

(56) References Cited

U.S. PATENT DOCUMENTS 4,442,665 A * 4/1984 Fick .......................... F02C 3/28 48/191
7,877,979 B2 * 2/2011 Osakabe .............. F01K 23/067 60/39.12
2009/0151315 A1 * 6/2009 Kamohara .............. C10J 3/723 60/39.24

FOREIGN PATENT DOCUMENTS

JP 3-5943 1/1991
JP 2656352 9/1997
(Continued)

OTHER PUBLICATIONS

International Search Report dated Dec. 22, 2014 in International Application No. PCT/JP2014/076821 (with English translation).
(Continued)

*Primary Examiner* — Andrew H Nguyen
*Assistant Examiner* — Stephanie Cheng
(74) *Attorney, Agent, or Firm* — Wenderoth, Lind & Ponack, L.L.P.

(57) ABSTRACT

A control device for a power generation system whereby power is generated by a first power source that operates by burning a fuel. The control device identifies, on the basis of a pressure difference in a prior-stage mechanism that supplies the fuel to the first power source, a fuel capacity that
(Continued)

compensates for the pressure difference in the prior-stage mechanism. The pressure difference is the difference between a pressure set for the fuel before a load change in the prior-stage mechanism and a pressure set for the fuel after the load change in the prior-stage mechanism. The control device calculates a fuel supply command value, which is a command value for adjusting the amount of fuel supplied to a fuel supply device that supplies the fuel to the first power source, and is output to the fuel supply device using a fuel supply acceleration command value.

3 Claims, 6 Drawing Sheets

(51) Int. Cl.

| | |
|---|---|
| ***F01K 23/10*** | (2006.01) |
| *F02C 3/28* | (2006.01) |
| *F01K 23/16* | (2006.01) |
| *F02C 9/40* | (2006.01) |
| *F02C 6/18* | (2006.01) |

(52) U.S. Cl.
CPC .................. *F02C 3/28* (2013.01); *F02C 6/18* (2013.01); *F02C 9/40* (2013.01); *F05D 2220/722* (2013.01); *F05D 2270/3015* (2013.01); *Y02E 20/18* (2013.01)

(56) References Cited

FOREIGN PATENT DOCUMENTS

| | | |
|---|---|---|
| JP | 4745940 | 8/2011 |
| WO | 2008/056781 | 5/2008 |
| WO | 2008/149731 | 12/2008 |
| WO | 2012/128813 | 9/2012 |

OTHER PUBLICATIONS

Written Opinion of the International Searching Authority dated Dec. 22, 2014 in International Application No. PCT/JP2014/076821 (with English translation).

* cited by examiner

WITH RESPECT TO DIFFERENCE OF SYSTEM GAS HOLDING AMOUNT DUE TO DIFFERENCE OF SYSTEM GAS PRESSURE BEFORE AND AFTER LOAD CHANGE WHEN LOAD INCREASES

PRESSURE BEFORE LOAD CHANGE: a

PRESSURE AFTER LOAD CHANGE: b

CONTROL DEVICE AND CONTROL METHOD USING FUEL SUPPLY ACCELERATION COMMAND VALUE

CROSS-REFERENCE TO RELATED APPLICATION

Priority is claimed from Japanese Patent Application No. 2014-026662, filed Feb. 14, 2014, the contents of which are incorporated herein by reference.

TECHNICAL FIELD

The present invention relates to a control device and a control method of an Integrated coal Gasification Combined Cycle.

BACKGROUND ART

An Integrated coal Gasification Combined Cycle (IGCC) is a power generation technology which uses a flammable gas, which is obtained by gasifying a hydrocarbon originating fuel such as coal, biomass, or petroleum residue oil, as the fuel.

The IGCC plant includes a gas turbine which uses the flammable gas as a fuel, and a steam turbine which is operated by steam obtained by recovering exhaust heat of the gas turbine. The IGCC plant further includes a generator which is configured so as to be coaxial with the gas turbine and the steam turbine or a generator which is multiaxially configured, and drives the generator by the gas turbine and the steam turbine so as to generate power.

Hereinafter, a configuration of the IGCC will be described with reference to FIG. 1. FIG. 1 is an example of a configuration diagram of the IGCC. Coal supply equipment 1 crushes raw coal and supplies pulverized coal to a gasifier 2. An air separation device 10 sucks air from atmosphere, separates the air into nitrogen and oxygen, and supplies the separated nitrogen and oxygen to the gasifier 2. In addition, an air booster 11 sucks air and supplies compressed air to the gasifier 2. The nitrogen supplied from the air separation device 10 is used so as to transport coal and char. In addition, the oxygen supplied from the air separation device 10 and the compressed air supplied from the air booster 11 are used so as to gasify coal. The gasifier 2 burns the coal and generates fuel gas. The fuel gas is fed to a high temperature filter 3. The high temperature filter 3 recovers the char. The fuel gas is also fed to gas purification unit 4, and sulfur compounds, nitrogen compounds, or the like are removed. The refined fuel gas is supplied to a combustor 5 of the gas turbine while a flow rate of the fuel gas is controlled by a gas turbine governor 14. The gas turbine burns fuel gas with air sucked from a gas turbine compressor 7, and the gas turbine 6 operates. A HRSG 12 recovers exhaust heat of the gas turbine in order to generate steam, and supplies the steam to a steam turbine 8. The steam turbine 8 is operated by the supplied steam. Flue gas produced when the steam is generated is discarded from a stack 13. Shafts of the gas turbine 6 and the steam turbine 8 are connected to a generator 9, and the gas turbine 6 and the steam turbine 8 drive the generator 9 so as to generate power.

A control device 50 controls an output of the Integrated coal Gasification Combined Cycle. Hereinafter, an output control of the related art will be described with reference to FIG. 6. FIG. 6 is a diagram showing an example of an output control system of the IGCC in the related art. The control device 50 determines a generator output command (MWD) according to a demand load (S100). Next, the control device 50 calculates a deviation between an output value (S101) of the generator 9 measured by a predetermined method and the generator output command (S102). The control device 50 performs a GT control (S103) which corrects the deviation, and adjusts an opening degree of the gas turbine governor ("GT GOV") 14 (S104).

Moreover, the control device 50 calculates a base gasifier input command (GIDO) (S108) and a set value of a system gas pressure based on the generator output command in parallel with the processing (S100 to S104). In order to calculate the set value of the system gas pressure from the generator output command, a function FX is used (S109).

In addition, the control device 50 acquires an actual measurement value (S110) of the system gas pressure which is measured by a pressure gauge 15, and calculates a deviation between the actual measurement value and the set value of the system gas pressure (S111). The control device 50 calculates gasifier input command corrections which indicate flow rates of coal, air, and oxygen input to the gasifier 2 based on the calculated pressure deviation (S112). The control device 50 adds the base gasifier input command to the gasifier input command corrections (S113), and obtains a gasifier input command (GID) (S114). The control device 50 calculates a coal flow rate command (S115), an air flow rate command (S116), and an oxygen flow rate command (S117) from the gasifier input command, and controls the coal, the oxygen, and the air input to the gasifier 2. In this way, the control device 50 performs a feedback control such as a Proportional Integral (PI) control using the gasifier input command correction which corrects the pressure deviation calculated in S111.

In this output control, in a case where a load is constant and a power generation amount is set, the value of the gasifier input command correction is approximately zero except that the gasifier input command correction is changed so as to compensate for external disturbances such as in atmospheric temperature. Meanwhile, when the load is changed, the control device 50 adjusts an opening degree of the gas turbine governor 14 so as to correspond to temporal changes in the generator output command, and controls the output of the generator 9. In this case, the gasifier input command correction is a value which suppresses a pressure change generated by the change of the output. At this time, the gasifier input command (GID) is a sum of the base gasifier input command (GIDO) determined by the generator output command and the gasifier input command correction which compensates for the pressure deviation caused by the load change.

In addition, Japanese Patent No. 4745940 discloses a technology which performs an output control by adding, to the gasifier input command, a gasifier input acceleration command "GIR" which is a value for promoting an operation state of a gasifier 2 in which a load can be smoothly changed.

Technical Problem

However, in general, when a load is changed in a combined plant, delay occurs in an output response of a steam turbine. In addition, in this case, the output of the gas turbine changes more rapidly than a rate of change in the generator output command so as to compensate for the output of the steam turbine, and the output of the combined plant is controlled so as to correspond to the generator output command. At this time, the operation of the gas turbine is likely to cause a change in the system gas pressure.

In the IGCC, since a gas turbine fuel pressure set value and a gas turbine fuel consumption amount change (are dependent on a heat value) according to the load change in addition to the operation of the gas turbine, the system gas pressure is likely to change greatly.

In the case where a change in the system gas pressure is settled (the set operation state is continuously maintained) by the feedback control (S112), a time is required until the settlement is completed. In addition, if a gain of the feedback control is too large, an excessive response is generated with respect to a minute external disturbance at the time of the settlement, and stability of the plant is likely to deteriorate.

SUMMARY OF INVENTION

The present invention provides a control device and a control method capable of solving the above-described problems.

Solution to Problem

According to a first aspect of the present invention, there is provided a control device of a power generation system which generates power by a first power source which operates by burning a fuel, in which the control device identifies, on the basis of a pressure difference between a pressure of the fuel which is set before a load change in a fuel gas generation system which supplies the fuel to the first power source and a pressure of the fuel which is set after the load change in the fuel gas generation system, a volume of fuel which maintains the pressure of the fuel which is set after the load change, and the control device calculates a fuel supply command value which is a command value for adjusting the amount of the fuel supplied to a fuel supply device which supplies the fuel to the first power source, and is output to the fuel supply device using a fuel supply acceleration command value which accelerates adjustment of the identified volume of fuel.

According to the first aspect of the present invention, since the fuel supply command value which is output to the fuel supply device is calculated using the fuel supply acceleration command value which accelerates the adjustment of the volume of fuel, it is possible to cope with a rapid load change.

According to a second aspect of the present invention, the control device of a power generation system further includes a second power source in which an output response is slower than that of the first power source, and generates power by the first power source and the second power source, and the control device calculates the fuel supply command value and outputs the fuel supply command value to the fuel supply device, and the fuel supply command value is obtained by adding, to the fuel supply acceleration command value, a base fuel supply command value calculated based on an output command value with respect to the first power source which is obtained by subtracting an output value of the second power source from an output command value with respect to the power generation system.

According to the second aspect of the present invention, since the fuel supply command value is calculated by adding, to the fuel supply acceleration command value, the base fuel supply command value calculated based on an output command value with respect to the first power source which is obtained by subtracting the output value of the second power source from the output command value with respect to the power generation system, and the fuel supply command value is output to the fuel supply device, it is possible to cope with a delay in response in the second power source (for example, steam turbine) having the output response which is slower than that of the first power source (for example, gas turbine).

According to a third aspect of the present invention, the control device of a power generation system calculates the fuel supply command value and outputs the fuel supply command to the fuel supply device, the fuel supply command value is obtained by adding, to a power generation system acceleration command value, a base fuel supply command value calculated based on an output command value with respect to the power generation system, and the power generation system acceleration command value is calculated based on an output acceleration command value which is a command value for adjusting the fuel supply amount input with respect to a change in the fuel pressure by the first power source during a change in load, and the fuel supply acceleration command value.

According to the third aspect of the present invention, it is not necessary to consider a response having a delayed follow-up with respect to the load change of the steam turbine.

According to a fourth aspect of the present invention, the control device of a power generation system corrects the base fuel supply command value using an atmospheric temperature.

According to the fourth aspect of the present invention, it is also possible to cope with a change in atmospheric temperature.

According to a fifth aspect of the present invention, there is provided a control method of a power generation system which generates power by a first power source which is driven by burning a fuel, including: a step of identifying, on the basis of a pressure difference between a pressure of the fuel which is set before a load change in a fuel gas generation system which supplies the fuel to the first power source and a pressure of the fuel which is set after the load change in the fuel gas generation system, a volume of fuel which compensates for the pressure difference in the prior-stage mechanism, and of calculating a fuel supply command value which is a command value for increasing and decreasing the amount of the fuel supplied to a fuel supply device which supplies the fuel to the first power source, and is output to the fuel supply device using a fuel supply acceleration command value which performs compensation by accelerating the identified volume of fuel.

According to a sixth aspect of the present invention, in the control method of the power generation system, the power generation system includes a second power source in which an output response is slower than that of the first power source and generates power by the first power source and the second power source, in which the control method further includes a step of calculating the fuel supply command value and outputting the fuel supply command value to the fuel supply device, and the fuel supply command value is obtained by adding, to the fuel supply acceleration command value, a base fuel supply command value calculated based on an output command value with respect to the first power source which is obtained by subtracting an output value of the second power source from an output command value with respect to the power generation system.

According to a seventh aspect of the present invention, the control method of a power generation system further includes a step of calculating the fuel supply command value and outputting the fuel supply command value to the fuel supply device, the fuel supply command value is obtained by adding, to a power generation system acceleration command value, a base fuel supply command value calculated based on an output command value with respect to the power generation system, and the power generation system acceleration command value is calculated based on an output acceleration command value which is a command value for adjusting the fuel supply amount input with respect to the change in the fuel pressure by the first power source in the load change, and a fuel supply acceleration command value.

According to an eighth aspect of the present invention, the control method of a power generation system corrects the base fuel supply command value using atmospheric temperature.

Advantageous Effects of Invention

According to above-described aspects of the present invention, balances in a pressure and a temperature of the entire power generation plant are adjusted, and it is possible to stably operate the entire power generation plant even if a load change occurs.

DESCRIPTION OF EMBODIMENTS

First Embodiment

Figure 1:
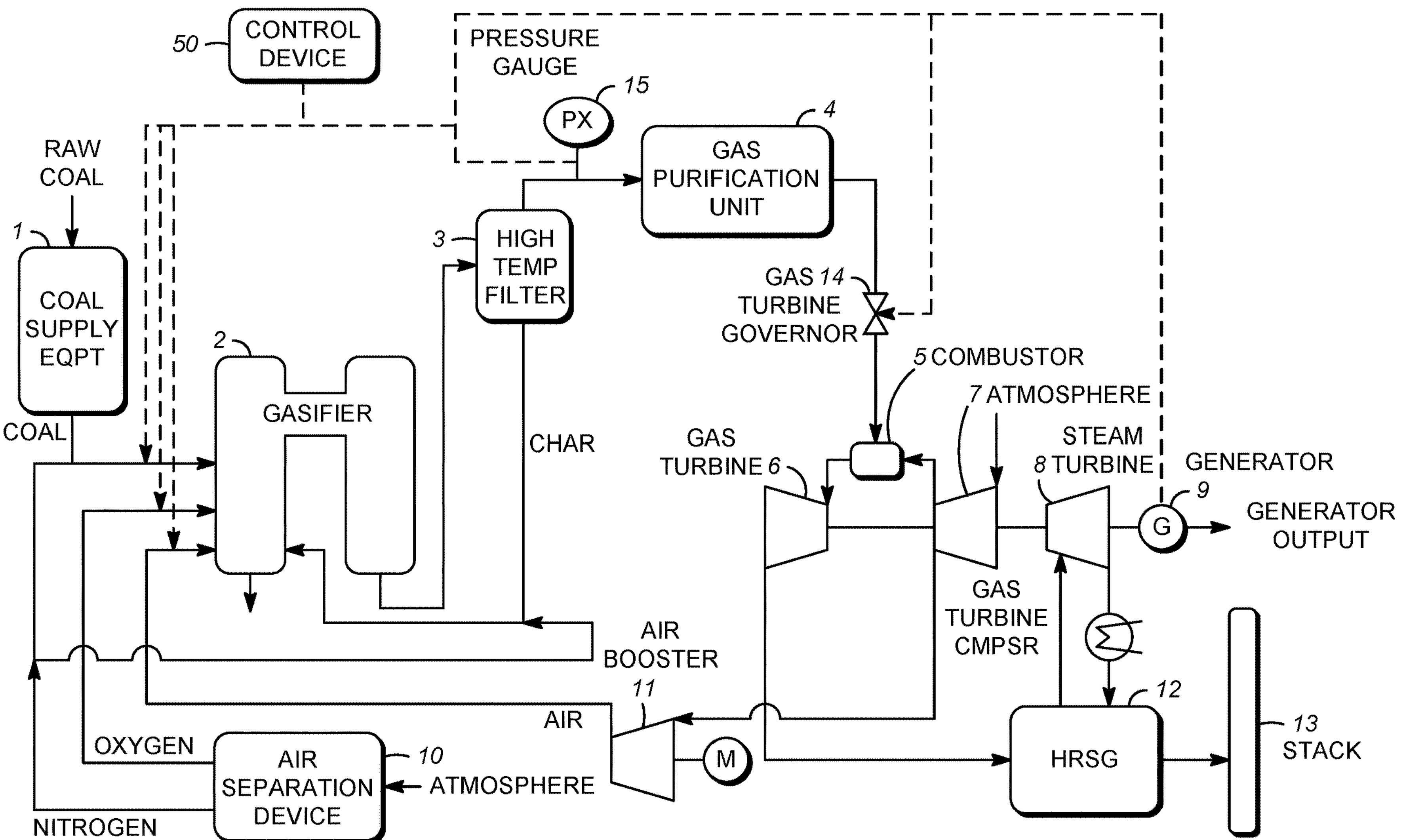
FIG. 1 is an example of a configuration diagram of an IGCC.

Hereinafter, an output control of an IGCC according to an embodiment of the present invention will be described with reference to FIGS. 1 to 3. The configuration of the IGCC is the same as the configuration which is described with reference to FIG. 1. A power generation system (IGCC) of the present embodiment is a power generation system which includes a first power source (gas turbine) which operates by burning a fuel, and a second power source (steam turbine) in which an output response is slower than that of the first power source, and drives a generator by the first power source and the second power source to generate power. The present embodiment is a method by which a control device 50 determines a gasifier input command (GID) which indicates a supply amount of a fuel such as coal, oxygen, or air which is supplied to a fuel supply device (gasifier).

Figure 2:
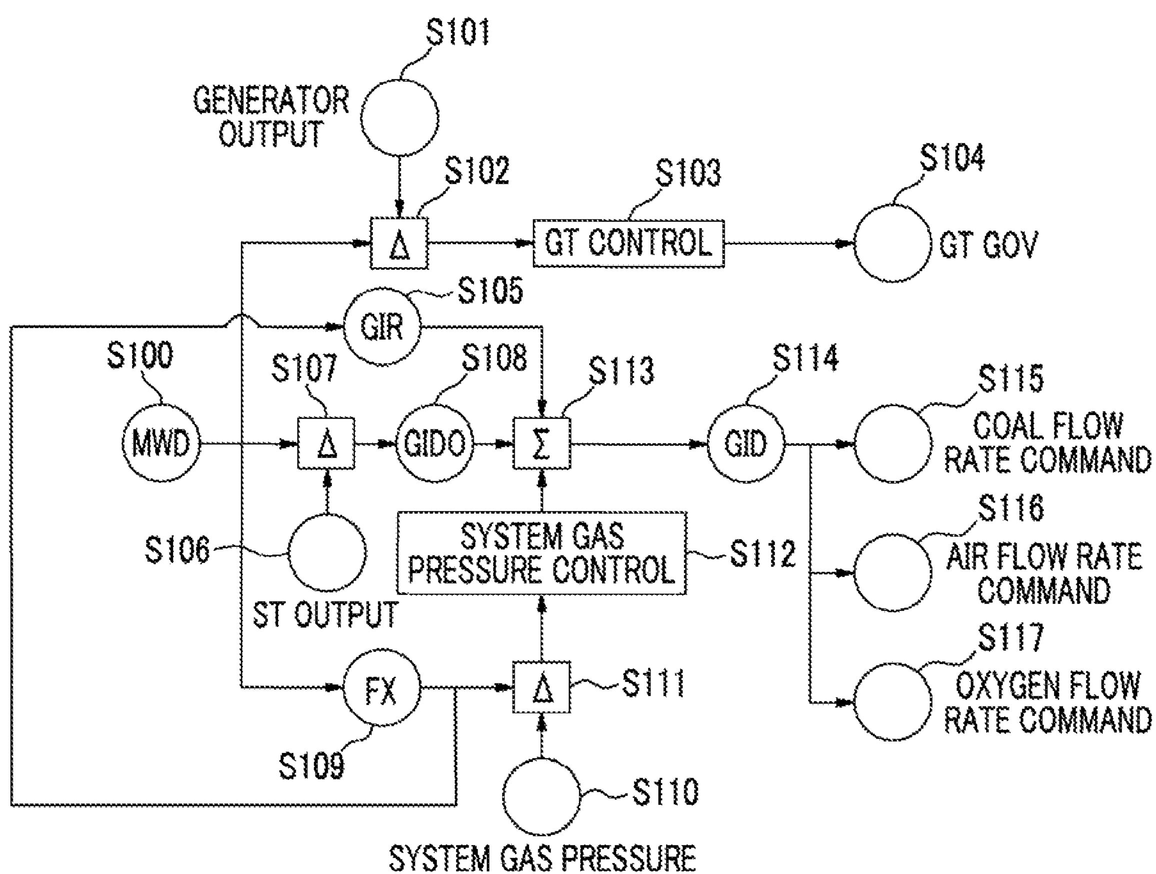
FIG. 2 is a diagram showing one example of an output control of the IGCC in a first embodiment according to the present invention.

FIG. 2 is a diagram showing an example of the output control of the IGCC in the present embodiment.

With reference to FIG. 2, an output control which is performed by the control device 50 in the present embodiment will be described.

The control device 50 acquires a demand of a load, and determines a generator output command value (MWD) according to the load (S100). For example, the control device 50 acquires an output value of a generator 9 which is measured by an output meter included in the generator 9 (S101), and calculates a deviation between a generator output command and the output value of the generator 9 (S102). Next, the control device 50 controls the gas turbine such that the output of the generator 9 coincides with the generator output command (S103). Specifically, the control device 50 determines an opening degree of a gas turbine governor ("GT GOV") 14 for correcting the deviation of the calculated output value, and controls the gas turbine governor 14 by the determined opening degree (S104). Accordingly, the control device 50 adjusts a fuel supplied to the combustor 5, and controls the output of the generator 9. For example, tables associated with the deviation of the output value and the opening degree of the gas turbine governor are recorded in a storage unit (not shown) included in the control device 50 in advance, and the opening degree of the gas turbine governor may be determined by reading the values.

In addition, the control device 50 acquires a set value of a system gas pressure after a load change corresponding to the generator output command by a function FX. Next, the control device 50 calculates a difference between the system gas pressure set value before the load change and the system gas pressure set value after the load change. In addition, the system gas pressure set value before the load change is recorded in the storage unit in advance, and the control device 50 reads the value. Moreover, the control device 50 determines a gasifier input acceleration command (GIR) corresponding to the calculated difference (S105). In order to obtain the gasifier input acceleration command, a gas pressure difference and the gasifier input acceleration command (GIR) are associated with each other in advance and are recorded in the storage unit, the control device 50 may obtain the gasifier input acceleration command by reading the value from the storage unit, or may obtain the gasifier input acceleration command by interpolation calculation using the read value. In addition, the system gas pressure is a pressure of fuel gas in a gas pipe system of an outlet side of the gasifier 2. In addition, system gas is the fuel gas. In the present embodiment, on the basis of a pressure difference or a pressure ratio between the pressure of the fuel gas which is set before the load change in a prior-stage mechanism (gas pipe system) of the gas turbine and the pressure of the fuel gas which is set after the load change, the control device 50 identifies a volume of fuel which is required to maintain the pressure of the fuel gas which is set after the load change. In addition, the control device 50 calculates the gasifier input acceleration command of compensating for the required volume of fuel, and determines the supply amount of the fuel considering the calculated gasifier input acceleration command. The "set fuel gas pressure" may be a planned value which is calculated by simulation or the like, or may be a value which is measured in an actual machine. Moreover, the gasifier input acceleration command considering the volume of fuel is described below with reference to FIG. 3.

Moreover, the control device 50 acquires the output value of the steam turbine which is measured by a predetermined method (S106), and calculates a difference between the output value and the generator output command (S107). For example, the output value of the steam turbine may be obtained through calculation by measuring pressures, temperatures, and flow rates at the inlet and outlet of the steam turbine. The calculated difference is an output command (GT MWD, gas turbine output command) with respect to the gas turbine. Sequentially, the control device 50 determines a base gasifier input command (GIDO) based on the gas turbine output command (S108). The base gasifier input command associated with the gas turbine output command is recorded in the storage unit in advance, the control device 50 may determine the base gasifier input command by reading the corresponding base gasifier input command using the gas turbine output command, or may determine the base gasifier input command by performing interpolation calculation on the read value.

Moreover, the control device 50 determines the set value of the system gas pressure determined according to the generator output command using the function FX (S109). In addition, the control device 50 acquires the pressure (system gas pressure) which is measured by the pressure gauge 15 (S110). Moreover, the control device 50 calculates a deviation between the system gas pressures set value and the system gas pressure (S111). The control device 50 calculates gasifier input command correction which performs the system gas pressure control, based on the calculated deviation (S112). In addition, in order to calculate the gasifier input command correction, a method of a feedback control such as PI control is used.

Finally, the control device 50 sums the gasifier input acceleration command (GIR), the base gasifier input command (GIDO), and the gasifier input command correction (S113). The summed value is the gasifier input command (GID) (S114). The control device 50 calculates each of a coal flow rate command (S115), an air flow rate command (S116), and an oxygen flow rate command (S117) based on the summed gasifier input command, and outputs each calculated value to each control point. In addition, the gasifier input command (GID) is an index for determining a flow rate of materials input to the gasifier, and the GID is used in a function set for each material to calculate a fuel flow rate (for example, coal) and an oxidizer flow rate (for example, air and oxygen).

Next, the gasifier input acceleration command which is determined by the processing of S105 will be described.

Figure 3:
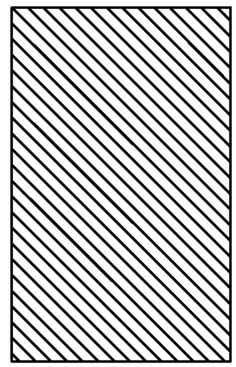
FIG. 3 is a diagram for explaining a determination method of a gasifier input acceleration command in the first embodiment according to the present invention.
Figure 3:
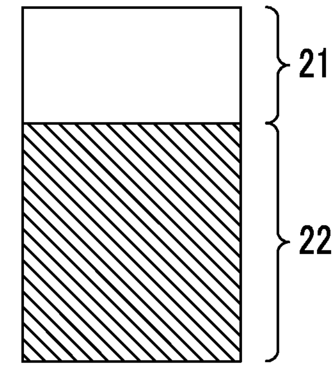

FIG. 3 is a diagram for explaining a difference of system gas holding amounts due to the difference of the system gas pressures before and after the load change when a load increases.

First, the left drawing indicates a volume of a system gas when the pressure of the gas pipe system (prior-stage mechanism) before the load change is a. The right drawing indicates the volume of the system gas existing in the gas pipe system from before an increase of a load when the system gas pressure is increased so as to be b in a state where the system gas having a volume indicated by a reference numeral 21 is added at the time of the increase of the load. At this time, the volume of the system gas originally existing in the gas pipe system becomes a/b (reference numeral 22). In the related art, particularly without considering that the volume of the system gas is compressed at the time of the increase of the load, the feedback control (S112) which corrects the deviation between the measurement value of the system gas pressure and the set value is performed based on the base gasifier input command (S108) corresponding to the generator output command. Accordingly, time is required until the output value of the generator is settled.

In the present embodiment, for example, in the example of FIG. 3, a feed forward control is performed using the gasifier input acceleration command (S105) in which the command value compensating for the system gas having the volume indicated by the reference numeral 21 is taken into consideration in advance. Accordingly, it is possible to decrease the deviation between the set value of the system gas pressure and the measurement value of the system gas pressure, and it is possible to decrease the time until the change of the system gas pressure is settled. Therefore, it is possible to stably operate the entire power generation plant even though the load change occurs.

In addition, the gasifier input acceleration command at this time is the gasifier input acceleration command (GIR) considering the volume difference of the fuel gas based on the pressure difference of the fuel gas before and after the load change in the prior-stage mechanism of the gas turbine, that is, the gas pipe system on the outlet side of the gasifier 2 included in the pressure gauge 15. The gasifier input acceleration command is adjusted and determined by simulation and a trial operation in an actual machine.

Second Embodiment

Figure 4:
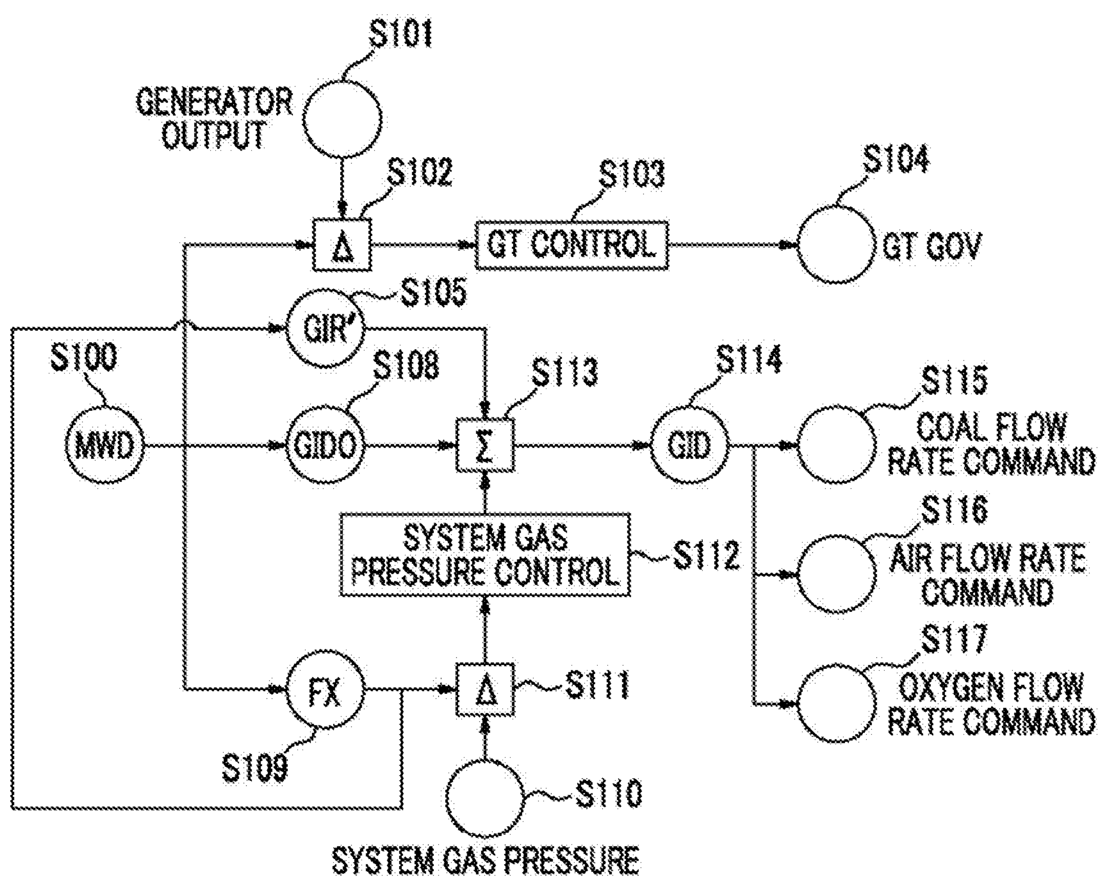
FIG. 4 is a diagram showing an example of an output control of the IGCC in a second embodiment of the present invention.

Moreover, in the first embodiment, in FIG. 2, the output command value with respect to the gas turbine is calculated by subtracting the output of the steam turbine from the generator output command. However, a method (second embodiment) is considered, in which the base gasifier input command is not determined based on the gas turbine output command, and is determined based on the generator output command. The second embodiment will be described with reference to the FIG. 4. FIG. 4 is a diagram showing an example of an output control of the IGCC in the second embodiment according to the present invention. In the present embodiment, as described above, the base gasifier input command is determined based on the generator output command (S108). Accordingly, not only the value which compensates for the change in the volume of the fuel gas due to the pressure change described with reference to FIG. 3 but also the value compensates for the change in the system gas pressure due to acceleration of the operation of the gas turbine is added to the gasifier input acceleration command (GIR') of the present embodiment. In the IGCC, in order to compensate for the delayed output response of the steam turbine and cause the output of the plant to follow the generator output command, the operation of the gas turbine is accelerated. However, at this time, the operation of the gas turbine is likely to generate the change in the system gas pressure. In the gasifier input acceleration command (GIR') in the present embodiment, a value (a power generation system acceleration command value) is used, which is calculated based on the output acceleration command value which is the command value input so as to suppress the change in the system gas pressure and the gasifier input acceleration command in the first embodiment. The output acceleration command value is a command value for suppressing the change in the system gas pressure generated by the operation of the gas turbine, and is adjusted and determined by simulation and a trial operation in an actual machine.

In addition, the acceleration of the operation of the gas turbine is indicated by a in the following descriptions. In a case where the generator output command which is the load change of the entire plant is changed by X %/min, rates of change in the loads of the gas turbine and the steam turbine are also changed by X %/min. However, delay in the response in the output of the steam turbine occurs due to heat transfer to steam or the like. If the delay state is defined as a %/min, the rate of change in the load of the steam turbine becomes X-a %/min. At this time, in order to match the rate of change in the load to the rate of change in the generator output command of the entire plant, the rate of change in the load of the gas turbine is set to X+a %/min.

According to the present embodiment, since the gasifier input acceleration command (GIR') considering the acceleration of the gas turbine operation is further used in addition to the gasifier input acceleration command in the first embodiment, even in a case where the steam turbine having a delayed output response is included in the plant, it is possible to suppress the change in the system gas pressure at the time of the load change. Accordingly, it is possible to stably operate the entire power generation plant even though the load change occurs.

Third Embodiment

Hereinafter, an output control according to a third embodiment of the present invention will be described with reference to FIG. 5.

Figure 5:
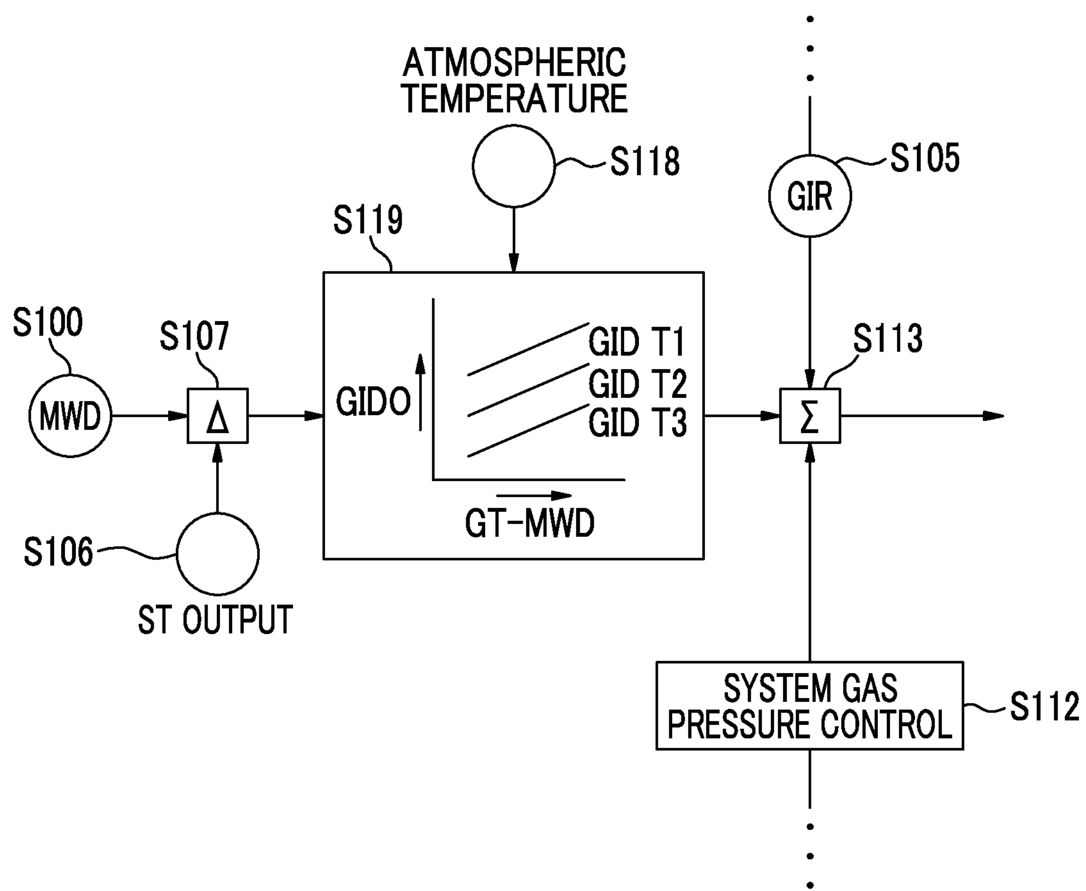
FIG. 5 is a diagram showing an example of an output control of the IGCC in a third embodiment of the present invention.
Figure 6:
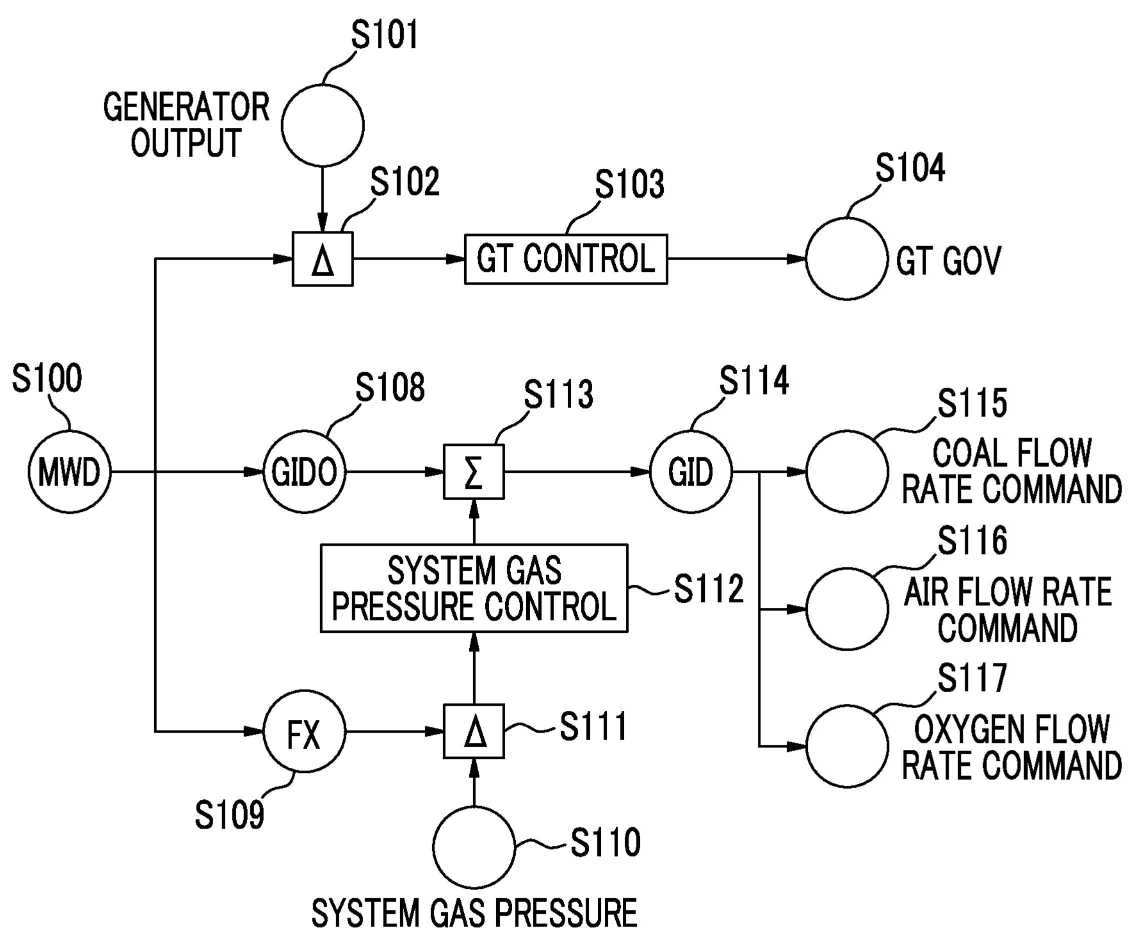
FIG. 6 is a diagram showing an example of an output control of the IGCC in the related art.

FIG. 5 is a diagram showing an example of an output control of the IGCC in the third embodiment of the present invention.

In FIG. 5, in the processing in the third embodiment, only portions of performing processing different from the processing of the first embodiment are shown. The processing which is not included in FIG. 5 is the same as the processing of FIG. 2.

The control device 50 determines the generator output command corresponding to the demand load (S100). In addition, the control device 50 calculates the gas turbine output command (GT_MWD) by acquiring the output value of the steam turbine and subtracting the output value of the steam turbine from the generator output command (S107). Next, the control device 50 acquires the atmospheric temperature from a thermometer which is provided in the vicinity of the gas turbine compressor 7. Next, using a function, a table, or the like indicating a correlation between the base gasifier input command for each atmospheric temperature recorded in the storage unit in advance, and the gas turbine output command, the control device 50 calculates a base gasifier input command "GIDO Tx" which performs an atmospheric temperature correction with the acquired atmospheric temperature and the gas turbine output command as the conditions. The subsequent processing is similar to that of the first embodiment. That is, in the present embodiment, the control device 50 calculates the gasifier input command by adding the base gasifier input command "GIDO Tx" which performs the atmospheric temperature correction, the gasifier input acceleration command, and the system gas pressure correction value.

According to the present embodiment, since the base gasifier input command is corrected according to the atmospheric temperature, it is possible to calculate a coal flow rate command value, an air flow rate command value, and an oxygen flow rate command value which are subjected to the atmospheric temperature correction. Accordingly, in addition to the effects of the first embodiment, it is possible to stably operate the entire power generation plant without being influenced by the atmospheric temperature. In the present embodiment, the first embodiment and the second embodiment can be combined.

In addition, the gas turbine is an example of the first power source. In addition, the system gas pressure is an example of the fuel pressure which is set before the load change in the prior-stage mechanism. Moreover, the gasifier is an example of the fuel supply device which supplies the fuel to the first power source. In addition, the steam turbine is an example of the second power source having a delayed output response. Moreover, the gasifier input command is an example of the fuel supply command values. In addition, the base fuel supply command value is an example of the base fuel supply command values. In addition, the gasifier input acceleration command is an example of the fuel supply acceleration command values.

In addition, a computer system is provided inside the above-described control device 50. Moreover, the process of each processing in the above-described control device 50 is stored in a computer readable recording medium of a program format, and the processing is performed by reading and performing the program using a computer. Here, the computer readable recording medium is a magnetic disk, a magneto-optical disk, a CD-ROM, a DVD-ROM, a semiconductor memory, or the like.

In addition, the computer program is distributed to a computer by a communication channel, and the computer which receives the distribution may carry out the program.

In addition, the program may realize a portion of the above-described functions.

In addition, the program may be a so-called difference file (a difference program) in which the above-described functions can be realized by a combination of the program and a program recorded in a computer system in advance.

Moreover, the components in the above-described embodiments may be appropriately replaced by the well-known components within a scope which does not depart from the gist of the present invention. Moreover, the technical scope of the present invention is not limited to the above-described embodiments, and for example, the control device according to the present invention may be applied to a plant such as a Poly-Generation or an Integrated coal Gasification Fuel cell Combined cycle (IGFC) including a gasifier or a gas turbine. In addition, various modifications may be applied within a scope which does not depart from the gist of the present invention.

INDUSTRIAL APPLICABILITY

According to the above-described control device and control method, the balances of the pressure and the temperature of the entire power generation plant are adjusted, and it is possible to stably operate the entire power generation plant even though the load is changed.

REFERENCE SIGNS LIST

1: coal supply equipment
2: gasifier
3: high temperature filter
4: gas purification unit
5: combustor
6: gas turbine
7: gas turbine compressor
8: steam turbine
9: generator
10: air separation device
11: air booster
12: HRSG
13: stack
14: gas turbine governor
15: pressure gauge

The invention claimed is:

1. A control device of a power generation system which is configured to generate power by a first power source which is configured to operate by burning a fuel, wherein the control device is configured to calculate a fuel supply acceleration command value, which is a command value to accelerate a fuel supply for compensation of a volume difference of the fuel based on a fuel pressure difference in a prior-stage mechanism, which is configured to supply the fuel to the first power source, between a pressure of the fuel which is set before a load change and a set value of a pressure of the fuel after the load change in the prior-stage mechanism which is calculated based on a load requested to the power generation system, the fuel supply acceleration command value being a command value for adjusting an amount of the fuel supplied to a fuel supply device which is configured to supply the fuel to the first power source, based on a relationship between the fuel pressure difference and the fuel supply acceleration command value associated with each other in advance and recorded in the control device, and the control device is configured to calculate a fuel supply command value for output to the fuel supply device using a value which is obtained by adding the fuel supply acceleration command value, a gasifier input command correction value which is calculated based on a deviation between the set value of the pressure of the fuel and a measurement value of the pressure of the fuel, and a base fuel supply command value calculated based on an output command value with respect to the first power source which is obtained by subtracting an output value of a second power source from the output command value with respect to the power generation system.

2. The control device according to claim 1, wherein the base fuel supply command value is corrected using atmospheric temperature.

3. A control method of a power generation system which is configured to generate power by a first power source which is configured to be driven by burning a fuel, the control method comprising:

calculating a fuel supply acceleration command value, which is a command value to accelerate a fuel supply for compensation of a volume difference of the fuel based on a fuel pressure difference in a prior-stage mechanism, which is configured to supply the fuel to the first power source, between a pressure of the fuel which is set before a load change and a set value of a pressure of the fuel after the load change in the prior-stage mechanism which is calculated based on a load requested to the power generation system, the fuel supply acceleration command value being a command value for adjusting an amount of the fuel supplied to a fuel supply device which is configured to supply the fuel to the first power source, based on a relationship between the fuel pressure difference and the fuel supply acceleration command value associated with each other in advance and previously recorded, and calculating a fuel supply command value for output to the fuel supply device using a value which is obtained by adding the fuel supply acceleration command value, a gasifier input command correction value which is calculated based on a deviation between the set value of the pressure of the fuel and a measurement value of the pressure of the fuel, and a base fuel supply command value calculated based on an output command value with respect to the first power source which is obtained by subtracting an output value of a second power source from the output command value with respect to the power generation system.

* * * * *